United States Patent [19]
Boylan

[11] Patent Number: 5,238,717
[45] Date of Patent: Aug. 24, 1993

[54] END CAPS FOR FILTER ELEMENTS

[75] Inventor: Michael A. Boylan, Cortland, N.Y.

[73] Assignee: Pall Corporation, Glen Cove, N.Y.

[21] Appl. No.: 691,822

[22] Filed: Apr. 26, 1991

[51] Int. Cl.$^5$ .............................................. B01D 27/08
[52] U.S. Cl. .............................. 428/35.7; 210/493.2;
 210/454; 210/232; 210/323.2
[58] Field of Search ................ 210/492.01, 493.2, 454,
 210/232, 323.2; 428/35.7, 33, 81, 192; 220/359,
 634, 601, 612

[56] References Cited

U.S. PATENT DOCUMENTS

| | | | |
|---|---|---|---|
| Re. 29,447 | 10/1977 | Farrow et al. | 210/232 |
| 3,850,813 | 11/1974 | Pall et al. | 210/497.01 |
| 3,867,294 | 2/1975 | Pall et al. | 210/497.01 |
| 4,402,830 | 9/1983 | Pall | 210/493.2 |
| 4,725,323 | 2/1988 | Ostreicher et al. | 156/69 |
| 4,799,602 | 1/1989 | Collins et al. | 220/359 |
| 4,908,130 | 3/1990 | Lynne | 210/454 |

FOREIGN PATENT DOCUMENTS 2204441 10/1973 France.
1437462 5/1976 United Kingdom.

*Primary Examiner*—Ellis P. Robinson
*Assistant Examiner*—Charles R. Nold
*Attorney, Agent, or Firm*—Leydig, Voit & Mayer

[57] ABSTRACT

An end cap for a filter element comprises first and second concentric components of a thermoplastic material. The first of the components forms a side wall and a base of a peripheral groove of the end cap while the second of the components forms a second side of the peripheral groove. The first and second components are connected by a weld extending around the components in the region of the peripheral groove. The weld may be an ultrasonic weld. This prevents distortion of the components at high temperatures by strengthening the composite while allowing use of lightweight inexpensive components that have smooth sealing surfaces with no injection mould parting lines.

23 Claims, 4 Drawing Sheets

END CAPS FOR FILTER ELEMENTS

The invention relates to end caps for filter elements.

In GB-A-1437462 there is described an end cap for a filter element having at least one peripheral groove to receive a sealing element, for use in capping a tubular filter element. The cap comprises a composite of abutting concentric components bonded or capable of being bonded together in one piece. Two abutting components respectively provide the sides of the or each peripheral groove and one of these two components provides the base of that groove. The total number of such components is at least equal to the number of peripheral grooves plus one and the outermost component is annulus. The composite has at one end a face shaped to be bonded to one end of a tubular filter element in a very tight seal to cap the tubular element. The or each peripheral groove has fixed dimensions after bonding together of the concentric components and has smooth sides and base for fluid-tight sealing engagement with the sealing element.

GB-A-1437462 contemplates the production of such an end cap from thermoplastic materials. It has been found, however, that when such end caps are used at temperatures approaching the softening point of the thermoplastic material, at least one of the components can distort and remain distorted when cool.

This is plainly a disadvantage where the associated filter element is required to be used for the filtration of fluids at temperatures close to the softening point of the thermoplastic material or where the filter element is periodically sterilized with fluids, such as steam, at temperatures close to the softening point of the thermoplastic material. One possible solution to this problem is the use of heavier wall-section components, but this is costly and would not provide a mechanism to use components without mould parting lines across the sealing surfaces.

According to the invention, there is provided an end cap for a filter element comprising first and second abutting concentric components of a thermoplastic material, one of said components forming a first side and a base of a peripheral groove of the end cap and the other of said components forming a second side of said peripheral groove, the one component being connected to the other component by a bond extending between and around the components in the region of the peripheral groove, the end cap having at one end a face shaped to be bonded to one end of a tubular filter element in a fluid-tight seal to cap the tubular element, the peripheral groove having fixed dimensions and having smooth sides and base for fluid-tight sealing engagement with a sealing element.

BRIEF DESCRIPTION OF THE DRAWINGS

The following is a more detailed description of some embodiments of the invention, by way of example, reference being made to the accompanying drawing in which.

The first end cap of FIGS. 1 to 5 is formed by an inner annular component 10, an intermediate annular component 11 and an outer annular component 12. The components may be formed from any suitable thermoplastic material, for example any of the thermoplastic materials disclosed in GB-A-1437462. Typically, however, the components are formed from polypropylene.

Figure 1:
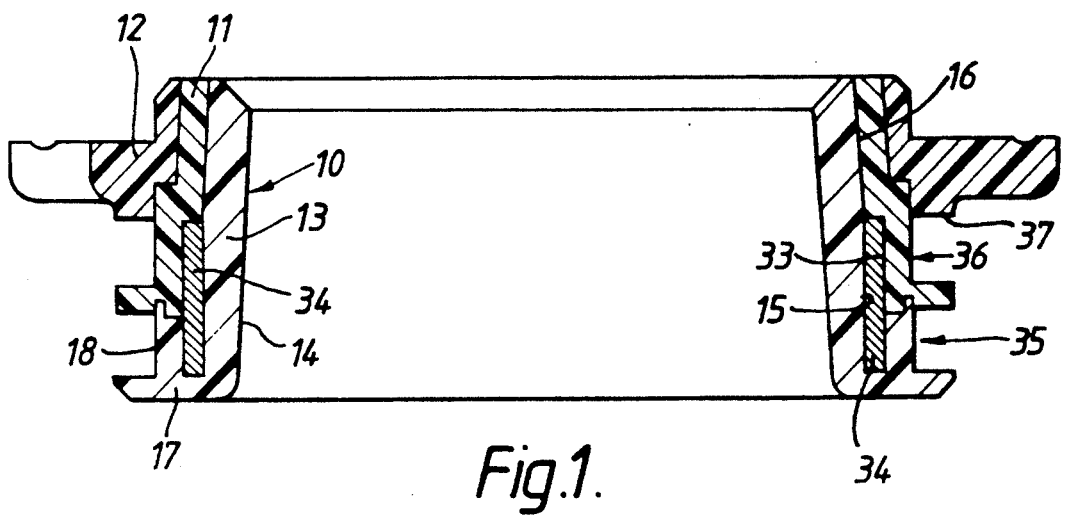
FIG. 1 is a cross-sectional view of a first form of assembled filter element end cap formed from three annular components arranged concentrically with one another.
Figure 2:
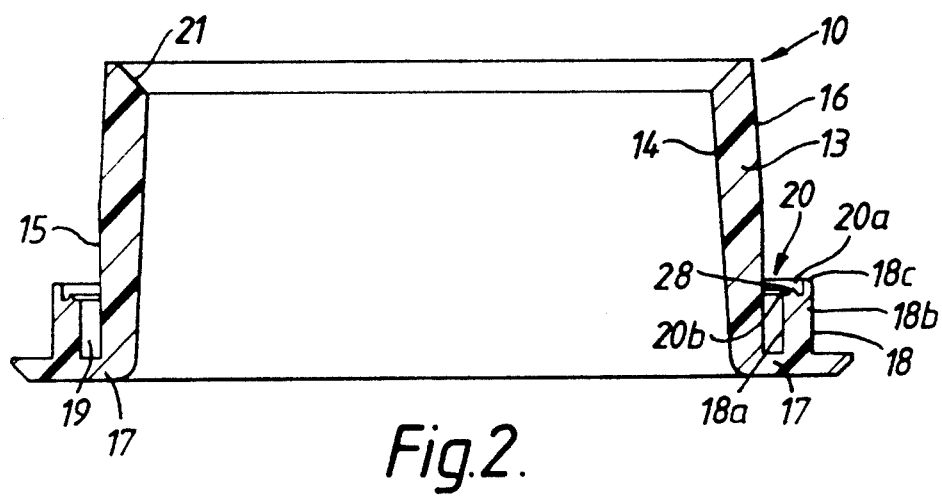
FIG. 2 is a cross-section of an inner component of the three components of the end cap of FIG. 1.

The inner component 10, as seen in FIGS. 1 and 2, comprises a body portion 13 which has an inner frusto-conical annular surface 14 whose cone angle may, for example, be 3° 30'. The exterior annular surface of the body portion 13 has an annular right cylindrical portion 15 extending from generally the axial mid-point of the inner component 10 to one end of the inner component 10. The remainder of the outer surface of the inner component 10, extending from the axial mid-point to the other end of the inner component 10, is formed by a frusto-conical portion 16 which has the same cone angle as the inner annular surface 14.

At one end, the body portion 13 is formed with a radially outwardly extending flange 17. An annular wall 18 projects from the flange 17, has right cylindrical inner and outer surfaces 18a, 18b connected by an annular radially extending end surface 18c, is coaxial with the body portion 13 and is spaced from the body portion by an annular groove 19. An inwardly directed L-shaped rabbet 20 is provided between the end surface 18c and the inner wall surface 18a and has an axial surface 20a and a radial surface 20b. The radial surface 20b is formed with a projection 28 having a cross-section which is the shape of an equilateral triangle.

At the opposite end of the inner component 10, there is provided an inwardly directed bevel 21.

Figure 3:
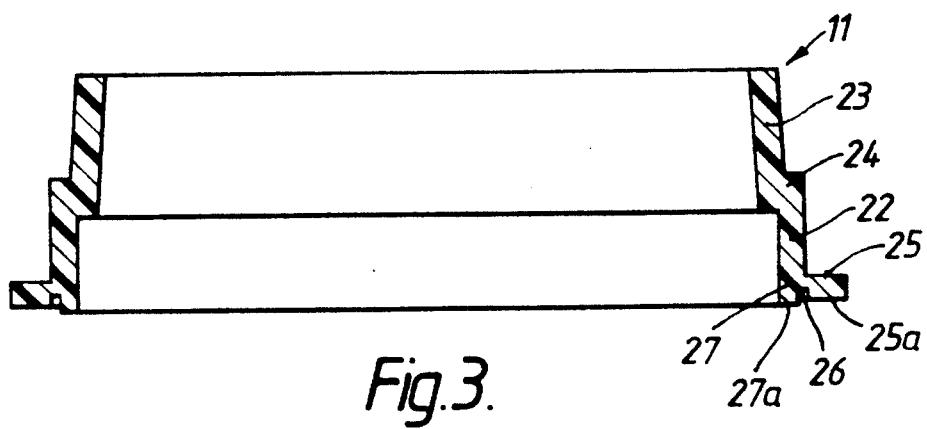
FIG. 3 is a cross-sectional view of an intermediate component of the three components of the end cap of FIG. 1.

The intermediate component 11 is best seen in FIGS. 1 and 3. The intermediate component 11 comprises a right cylindrical portion 22 and a frusto-conical portion 23 connected by an inwardly directed step 24 generally at the axial mid-point of the intermediate component.

The cone angle of the frusto-conical portion 23 matches the cone angle of the frusto-conical portion 16 of the outer surface of the inner component 10.

A radially outwardly directed flange 25 projects from the free end of the right cylindrical portion 22. At this free end, the flange 25 has an annular radially extending surface 25a which is formed with an annular channel 26 and an annular flange 27.

The interior offset provided by the step 24 is the same as the width of the groove 19. Further, the inner diameter of the right cylindrical portion 22 of the intermediate component 11 is the same as the inner diameter of the wall 18.

Figure 4:
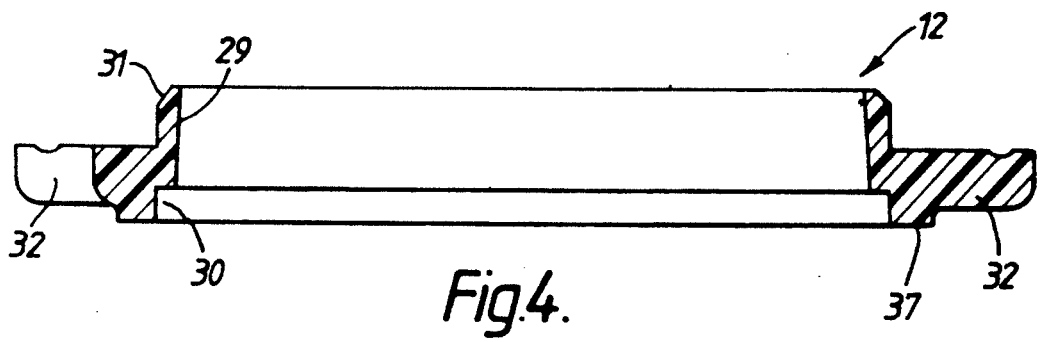
FIG. 4 is a cross-sectional view of an outer component of the three components of the end cap of FIG. 1.

The outer component 12, as shown in FIGS. 1 and 4, is generally annular with a frusto-conical inner surface 29 having the same cone angle as the frusto-conical portion 16 of the inner component 10. At one end, the outer component 12 is provided with an inwardly directed L-shaped rabbet 30. The other end of the outer component 12 has an outwardly directed bevel 31.

Figure 5:
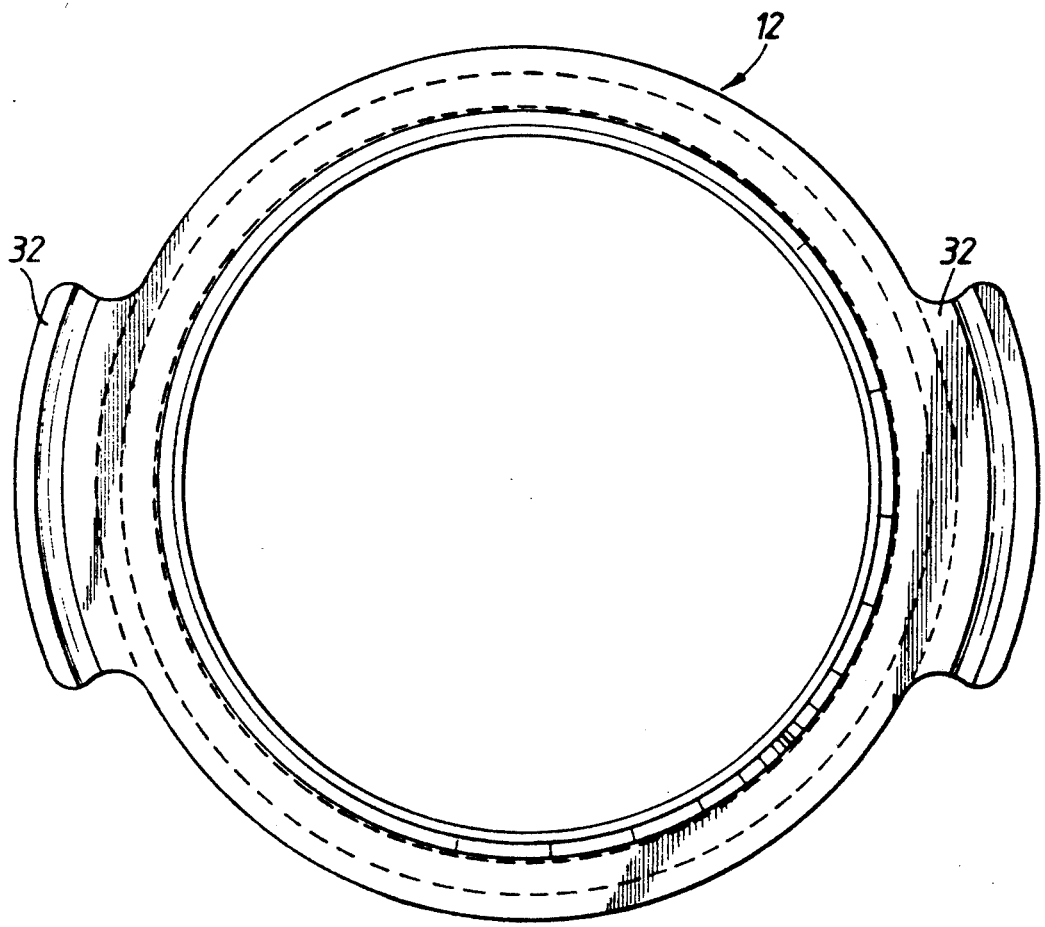
FIG. 5 is a plan view of the outer component of FIG. 4, showing arcuately extending flanges of the component.

Referring particularly to FIG. 5, the outer component 12 is provided with two arcuately extending flanges 32 arranged at diametrically opposite sides of the component 12.

In use, the three components, 10,11,12 are abutted together as shown in FIG. 1. The frusto-conical portion 16 of the inner component is an interference fit in the frusto-conical portion 23 of the intermediate component 11. When so positioned, the rabbet 20 in the wall 18 interfaces with the channel 26 and projection 27 in the intermediate component, so that the projection 28 of the inner component 10 bears on an end surface 27a of the annular flange 27 of the intermediate component 11.

When so configured, the groove 19 in the inner component 10 and the step 24 in the intermediate component define a closed annular cavity 33 (see FIG. 1) in which is received an annular ring 34 of metal or other suitable material such as high temperature plastics.

The inner surface 29 of the outer component 12 fits over the outer surface of the frusto-conical portion 23 of the intermediate component with the rabbet 30 abutting the outer portion of the step 24.

As seen in FIG. 1, the three components 10,11,12 provide the end cap with two annular peripheral grooves 35,36. The first of these grooves, 35, has one wall formed by the outer portion of the flange 17 of the inner component 10, a base formed by the outer surface of the wall 18 of the inner component 10 and a second side wall formed by the flange 25 on the intermediate component 11.

The second of the grooves 36 has one side wall formed by the flange 25 of the intermediate component 11, a base formed by the outer surface of the right cylindrical portion 22 of the intermediate component 11 and a second side formed by a radial end face 37 of the outer component 12.

It will be seen that the length of the cavity 33 in a direction parallel to the axis of the end cap is such that the cavity 33, and hence the ring 34, at least spans the bases of both grooves 35,36. The benefit of this is that the grooves 35,36 are thus fully supported over their whole width and circumference.

The inner and intermediate components 10,11 are bonded together in the following way.

Figure 6:
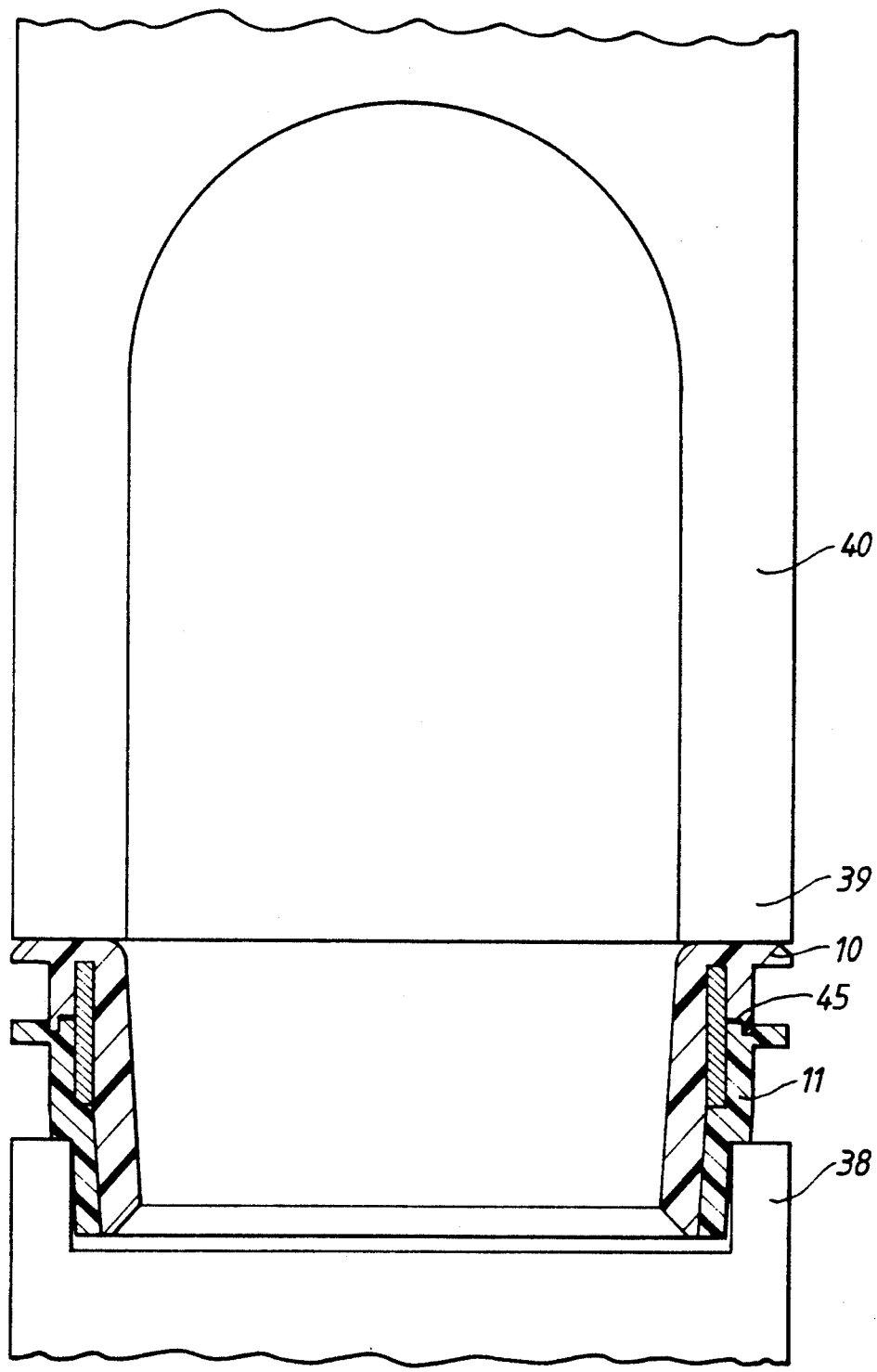
FIG. 6 is a schematic view of the end cap of FIGS. 2 and 3 mounted beneath a horn of an ultrasonic welding apparatus.

First, these two components 10,11 are abutted together as described above. At this stage, the outer component 12 is omitted. The two components 10,11 are then passed to an ultrasonic welding machine shown diagrammatically in FIG. 6. In this machine, the end cap is located on a platen 38 and a welding tool 39 is located above the end cap. The welding tool 39 is incorporated in a horn 40 of a conventional ultrasonic welding apparatus.

Ultrasonic energy is then applied to the components and the duration and power are such as to produce a weld 45 in the inner component 10 and the intermediate component 11 at the junction between the projection 28 and the surface 27a of the flange. In this regard, the projection 28 acts as an energy director to ensure precise location of the weld 45 and, as is conventional in ultrasonic welding, the duration of the signal and the power are such as to localize the welding at this point.

The arrangement of the projection 28 on the inner component 10 in an inwardly directed rabbet 20 in the wall 18 of the inner component 10, ensures that, when the ultrasonic weld is formed, flash from the weld does not enter the groove 35, it being blocked by a barrier formed by the axially extending annular wall 20b of the rabbet 20 and its engagement in the channel 26.

Although the inner and intermediate components 10,11 are described above as connected together by an ultrasonic weld, it will be appreciated that they may be connected together in other ways. For example, an alternative weld may be used such as a hot plate weld or another bonding process may be used.

In this way, the inner component 10 and the intermediate component 11 are bonded together. The outer component 12 is then abutted on the intermediate component 11, as described above, in order to complete the end cap. The components 10,11,12 are so dimensioned that, after this welding of the components 10,11 and the abutment of the component 12, the components 10,11,12 terminate at their ends adjacent the outer component 12 in a common plane normal to the common axis of the components.

Figure 7:
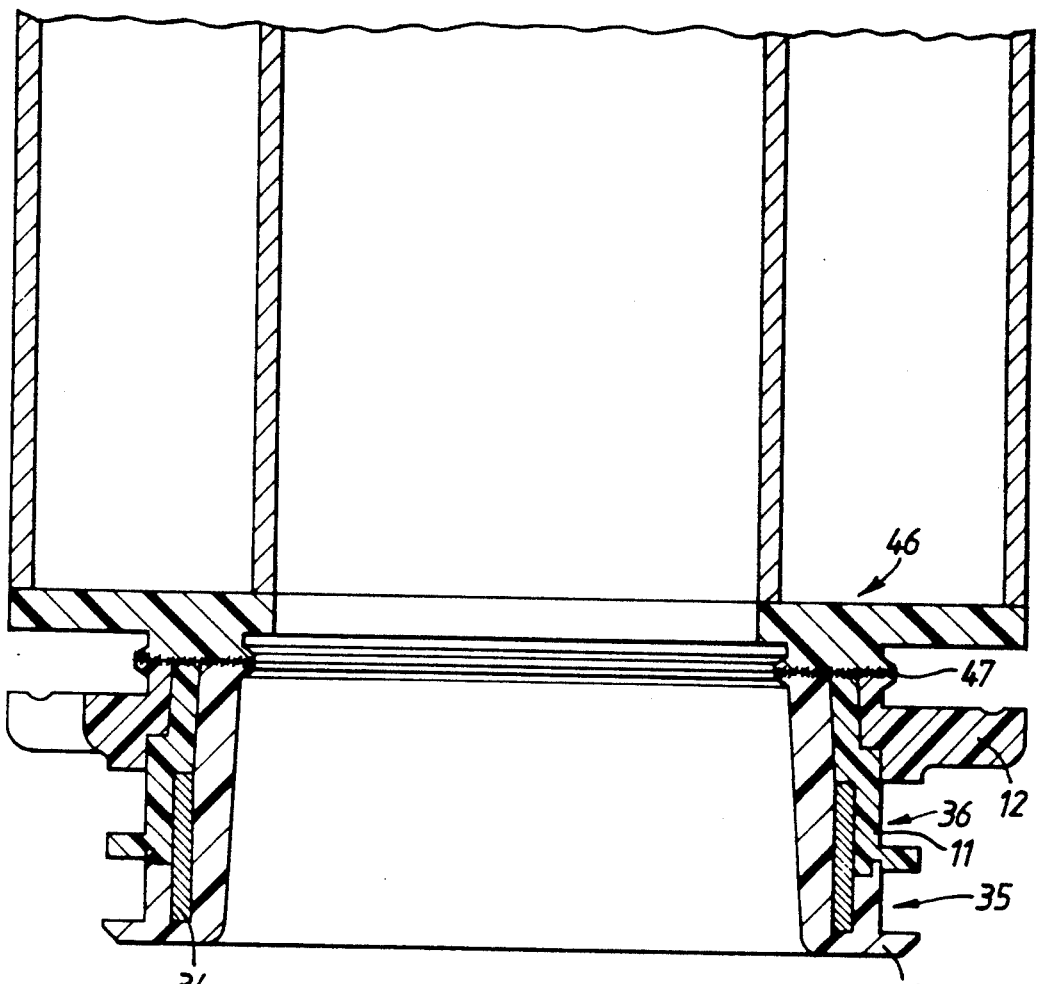
FIG. 7 is a similar view to FIG. 1 but showing the end cap attached to a filter element.

Next, as best seen in FIG. 7, the end cap is bonded to a filter element 46 with the bond 47 being at the coplanar ends of the inner, intermediate and outer elements 10,11 and 12. This bond may be effected by any one of the ways described in GB-A-1437462.

In this way, an end cap is produced in which any tendency of the flange 17 of the inner component 10 to distort relative to the intermediate component 11 is resisted by the weld between the wall 18 and the intermediate component 11. This means that the end cap can be operated under temperatures close to softening point of the material of which the end cap is made, without affecting the performance of the end cap as a result of relative distortion of the components 10,11.

For example, where the end cap is formed of polypropylene, there are two possible conditions of operation which may give rise to potentially damaging temperatures. The first is where the associated filter element is to be used for the continuous supply of hot filtered air for, for example, a fermentation process. In such usage, the temperature can approach or exceed 100° centrigrade which is close to the softening temperature of polypropylene. Under such circumstances, and in the absence of the ultrasonic weld, there is a tendency for the flange 17 of the inner component 10 to distort. However, with the ultrasonic weld described above with reference to the drawings, such distortion is avoided.

A second operational condition in which distortion may arise is when the end cap and the associated filter element are sterilized and cleaned by the passage therethrough of steam at temperatures in the range of from 120° C. to 140° C. These temperatures are sufficiently close to the softening point of polypropylene to tend to cause distortion of the flange 17 in the absence of the ultrasonic weld. With such an ultrasonic weld, however, distortion is avoided.

In addition, the end cap/filter element assembly has increased strength and can thus be used in more vigorous process applications.

The energy director for the weld is described above as a projection 28 shaped as described above and provided on the inner component 10. It will be appreciated, however, that the energy direction need not be provided by a projection of that shape—it could be provided by any suitable shape such as an annular rib of right-angled triangular section.

In addition, the interconnection between the inner component 10 and the intermediate component 11 need not be as described above with reference to FIGS. 1 to 7. In this regard, reference is additionally made to FIG. 8 where a second construction is shown.

Figure 8:
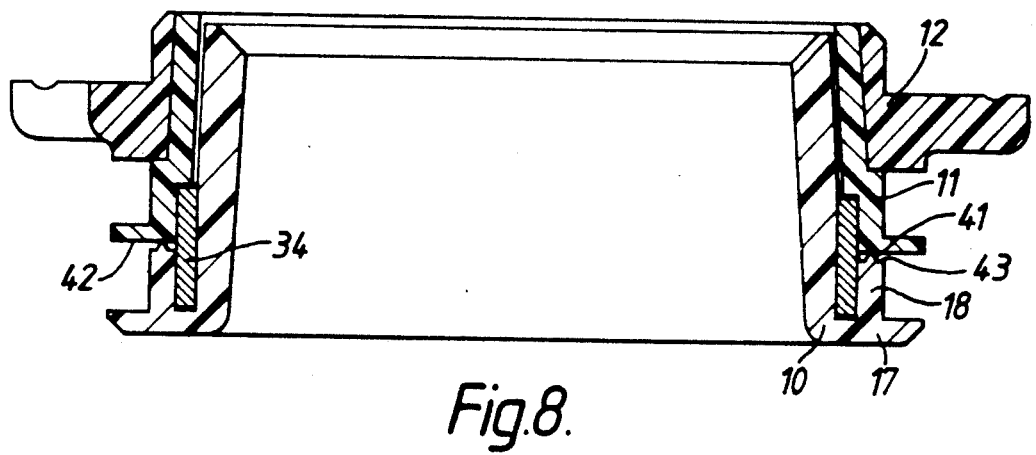
FIG. 8 is a cross-sectional view of a second form of assembled filter element end cap formed from three annular components arranged concentrically with one another.

Parts common to FIGS. 1 to 7, on the one hand, and FIG. 8, on the other hand, are given the same reference numerals and are not described in detail.

In this embodiment, the wall 18 omits the rabbet 20 and is provided with a radially extending annular surface 43 extending between the inner and outer surfaces 18a,18b and formed with a rib 41 of triangular cross-section. In the intermediate component 11, the channel 26 and the projection 27 are omitted so that, when assembled, as seen in FIG. 7, the rib 41 bears against a flat radially extending surface 42 of the flange 25 of the intermediate component 11. The components 10,11, with the ring 34 between them are placed in an ultrasonic welding machine as described above with reference to FIG. 6. An ultrasonic weld is created between the rib 41 and the surface 42 of the flange 25, with the rib 41 acting as an energy director.

Of course, the structure described above with reference to the drawings could be varied in a number of ways. Some possibilities are given below.

The metal ring 34 is not essential. It could be omitted with the wall 18 being omitted and replaced by an annular step in the exterior surface of the inner component. The inward step 24 in the intermediate component would then also be omitted so that the outer surface of the inner component engages the inner surface of the cylindrical part 24 of the intermediate member 12.

There need not be three components 10,11,12; there could be only two components, just the inner component 10 and the intermediate component 12. In this case, the cavity 33, where provided, would span only the base of the single peripheral groove. Alternatively, there could be four or more components forming three or more grooves; various possibilities are discussed in GB-A-1437462.

Where there are three or more components, there could be ultrasonic welds between the intermediate component 11 and the outer component 12 and between the outer component 12 and a successive component and so on.

The ultrasonic weld need not be between the wall 18 and the flange 25, it could be between any conveniently arranged parts which are in the region of a peripheral groove formed by two components. The bond need not be by ultrasonic welding; it could be by solvent bonding or by friction welding or by radio-frequency welding.

It will be appreciated that where a ring 34 is provided, the ring will be completely encapsulated within the end cap once the end cap is connected to a filter element. This means that there will be no possibility of the ring 34 contacting the process fluids. As a result of this, it may be possible to form the ring from materials other than stainless steel—for example, other metals or even high strength plastics materials.

I claim:

1. A filter element end cap comprising first and second abutting concentric components of a thermoplastic material, the first component forming a first side and a base of an outer peripheral groove of the end cap and the second component forming a second side of said peripheral groove, the first component being connected to the second component by a bond formed between and extending along the components in the region of the peripheral groove, the end cap having at one end a face shaped to be bonded to one end of a tubular filter element in a fluid-tight seal to cap the tubular element, the peripheral groove having fixed dimensions and having smooth sides and base for fluid-tight sealing engagement with a sealing element.

2. An end cap according to claim 1 wherein the portion of the first component that forms the base of the peripheral groove includes a surface which engages a surface of a portion of the second component that forms the second side of the peripheral groove, the bond being between said surfaces.

3. An end cap according to claim 2 wherein said surface of the first component is a radially extending annular surface, the surface of the second component also being a radially extending annular surface, the bond being between said radially extending surfaces.

4. A filter element end cap comprising first and second abutting concentric components of a thermoplastic material, the first component forming a first side and a base of an outer peripheral groove of the end cap and the second component forming a second side of said peripheral groove, the first component being connected to the second component by an ultrasonic weld formed between and extending along the components in the region of the peripheral groove, the end cap having at one end a face shaped to be bonded to one end of a tubular filter element in a fluid-tight seal to cap the tubular element, the peripheral groove having fixed dimensions and having smooth sides and base for fluid-tight sealing engagement with a sealing element, the portion of the first component that forms the base of the peripheral groove including a surface which engages a surface of a portion of the second component that forms the second side of the peripheral groove, the ultrasonic weld being between said surfaces, one of said surfaces including, prior to ultrasonic welding, an energy director to localize the weld at the energy director.

5. An end cap according to claim 4 wherein said surface of the first component is a radially extending annular surface, the surface of the second component also being a radially extending surface, the energy director being included on one of said surfaces so that the weld is between said surfaces.

6. An end cap according to claim 4 wherein the energy director is an annular rib of triangular cross-section.

7. A filter element end cap comprising first and second abutting concentric components of a thermoplastic material, the first component forming a first side and a base of an outer peripheral groove of the end cap and the second component forming a second side of said peripheral groove, the first component being connected to the second component by a bond formed between and extending along the components in the region of the peripheral groove, the end cap having at one end a face shaped to be bonded to one end of a tubular filter element in a fluid-tight seal to cap the tubular element, the peripheral groove having fixed dimensions and having smooth sides and base for fluid-tight sealing engagement with a sealing element, a barrier being provided between the bond and the peripheral groove to prevent material from the bond reaching the peripheral groove.

8. An end cap according to claim 7 wherein the first component that forms the base of the peripheral groove, includes a radially extending annular surface which engages a radially extending annular surface of the second component, the bond being between said surfaces and the barrier being provided by an annular axially ending surface between said bond and the peripheral groove.

9. An end cap according to claim 8 wherein the first component is formed with an annular inwardly directed rabbet which provides said radially and axially extending surfaces of the first component, the second component including a part which projects into said rabbet and which is formed with the annular radially extending surface of the second component.

10. An end cap according to claim 9 wherein the first component includes an annular wall having inner and outer surfaces, and a radially extending end surface, the outer wall surface forming the base of the peripheral groove and the rabbet being formed between said end surface and said inner surface.

11. An end cap according to claim 10 wherein the second component includes an annular radially extending surface at one end thereof, said surface including an annular channel which receives the end surface of said wall, the surface of the second component also including an annular projection which is received in said rabbet and which includes the annular radially extending surface which is bonded to the rabbet surface.

12. An end cap according to claim 3 wherein the first component includes an annular wall having inner and outer surfaces, said radially extending annular surface being provided at an end of said wall between said inner and outer surfaces, the annular radially-extending surface of the second component being provided at an end of the surface.

13. An end cap according to claim 12 wherein the bond is an ultrasonic weld, one of said surfaces including, prior to ultrasonic welding, an energy director to determine the position of the weld.

14. An end cap according to claim 13 wherein the energy director is an annular rib of triangular cross-section.

15. An end cap according to claim 14 wherein the triangular cross-section of the energy director is chosen from the group of a right-angled triangle and an equilateral triangle.

16. An end cap according to claim 1 wherein the first component includes an annular body portion having at one end a radially outwardly projecting flange, an annular wall extending from said flange parallel to and spaced from an outer annular surface of the body portion and terminating in an end, the end of the wall engaging the second component to form an annular cavity between the outer surface of the body portion and an inner surface of the wall, a reinforcing ring being provided in said cavity, an outer surface of the wall forming the base of the peripheral groove and the axial length of the cavity and the reinforcing ring being at least as long as the axial length of the base.

17. An end cap according to claim 16 wherein a third annular component is provided concentric with said first and second components and abutting said second component and one of said second and third components forming a first side and a base of a second outer peripheral groove of the end cap and the other of the second and third components forming a second side of said second peripheral groove, the second component including an inner annular surface spaced from the outer surface of the first component and extending from an end of the second component to an inwardly directed step provided intermediate the ends of the second component to extend the cavity with the axial length of the cavity and the reinforcing ring being at least as long as the axial length of the bases of the first-mentioned and second peripheral grooves.

18. An end cap according to claim 1 wherein the bond is formed by a solvent bond.

19. An end cap according to claim 1 wherein the bond is formed by a friction weld.

20. An end cap according to claim 16 wherein the reinforcing ring is of metal.

21. An end cap according to claim 16 wherein the reinforcing ring is of a thermoplastic material.

22. A filter arrangement comprising:
  a tubular filter element having an open end; and
  an end cap comprising first and second abutting concentric components of a thermoplastic material, the first component forming a first side and a base of an outer peripheral groove of the end cap and the second component forming a second side of said peripheral groove, the first component being connected to the second component by a bond formed between and extending along the components in the region of the peripheral groove, the end cap having at one end a face bonded to the open end of the tubular filter element in a fluid-tight seal to cap the tubular element, the peripheral groove having fixed dimensions and having smooth sides and base for fluid-tight sealing engagement with a sealing element.

23. A filter arrangement according to claim 22, wherein the first component includes an annular body portion having at one end a radially outwardly projecting flange, an annular wall extending from said flange parallel to and spaced from an outer annular surface of the body portion and terminating in an end, the end of the wall engaging the second component to form an annular cavity between the outer surface of the body portion and an inner surface of the wall, a reinforcing ring being provided in said cavity, an outer surface of the wall forming the base of the peripheral groove and the axial length of the cavity and the reinforcing ring being at least as long as the axial length of the base, the bond between the end cap and the filter element and the bond between the components of the end cap encapsulating the reinforcing ring within the end cap.

* * * * *